United States Patent
Marko

(10) Patent No.: US 6,579,654 B1
(45) Date of Patent: Jun. 17, 2003

(54) POLYMERIZATION STABILIZERS

(75) Inventor: Herbert Lee Marko, Maylands (AU)

(73) Assignee: Research Laboratories of Australia Pty Ltd, Eastwood (AU)

(*) Notice: Subject to any disclaimer, the term of this patent is extended or adjusted under 35 U.S.C. 154(b) by 0 days.

(21) Appl. No.: 09/979,698

(22) PCT Filed: May 11, 2000

(86) PCT No.: PCT/AU00/00434
§ 371 (c)(1),
(2), (4) Date: Nov. 6, 2001

(87) PCT Pub. No.: WO00/69918
PCT Pub. Date: Nov. 23, 2000

(30) Foreign Application Priority Data

May 13, 1999 (AU) .............................. PQ0312

(51) Int. Cl.$^7$ ................... G03G 9/087; C08F 267/04
(52) U.S. Cl. .................. 430/137.17; 525/285; 525/301
(58) Field of Search ................ 430/115, 116, 430/137.17, 113; 525/285, 301

(56) References Cited

U.S. PATENT DOCUMENTS

| 5,189,102 A | 2/1993 | Tsubuko et al. |
| 5,202,215 A | 4/1993 | Kanakura et al. |
| 5,206,107 A | 4/1993 | Pearlstine |
| 5,612,162 A | 3/1997 | Lawson et al. |
| 6,287,741 B1 * | 9/2001 | Marko ........................ 430/115 |

FOREIGN PATENT DOCUMENTS

| JP | 3-292 252 A | 12/1991 |
| JP | 5-262 804 A | 12/1993 |

* cited by examiner

Primary Examiner—John Goodrow
(74) Attorney, Agent, or Firm—Brown Martin Haller & McClain LLP

(57) ABSTRACT

A method of preparing a liquid ink or liquid toner for printing including the steps of dispersing a monomer in a carrier fluid and a polymerization stabilizer comprising a multi or single functional group containing polysiloxane, and in situ polymerizing the monomer to form uniform polymer particles dispersed in the carrier fluid. The multi or single functional group on the polysiloxane is amino, carboxylic acid, vinyl and hydroxyl.

21 Claims, No Drawings

POLYMERIZATION STABILIZERS

FIELD OF INVENTION

This invention relates to liquid compositions suitable as inks or toners for non-impact printing. The invention is particularly related to the manufacture of such liquid inks or toners.

BACKGROUND OF THE INVENTION

It has been recognised that certain properties of carrier fluids for inks or liquid developers are required for effective functioning in conventional electrostatic processes. Many of the physical requirements are mandatory, as known by those skilled in the art, but there are also other considerations, such as low toxicity, fire safety, low solvent power, low odour etc. For these reasons, isoparaffinic-hydrocarbons such as the Isopar® range manufactured by Exxon Corporation, the Shellsol® range manufactured by Shell Chemical and the Soltrol® range manufactured by Phillips Petroleum became the industry standards for liquid carriers.

In more recent times, however, increased environmental concerns have placed these non-impact liquid processes under increasing pressure to further reduce or eliminate volatile emissions.

Other carrier materials for inks or liquid developers have been investigated, and of these, silicone fluids are clearly liquids which combine all previously and currently desired properties for a modern ink and liquid toner carrier.

In general, an electrostatic ink or liquid toner for developing electrostatic images is prepared by dispersing an inorganic or organic colorant such as iron oxide, carbon black, nigrosine, phthalocyanine blue, benzidine yellow, quinacridone pink and the like into a liquid vehicle which may contain dissolved or dispersed therein synthetic or naturally occurring polymers such as acrylics and their copolymers, alkyds, rosins, rosin esters, epoxies, polyvinyl acetate, styrene-butadiene, cyclised rubber, ethylene vinyl acetate copolymers, polyethylene, etc. Additionally, to impart or enhance an electrostatic charge on such dispersed particles, additives known as charge directors or charge control agents may be included. Such materials can be metallic soaps, fatty acids, lecithin, and the like.

Silicone fluids have been used as a carrier for liquids for some time, for example, U.S. Pat. No. 3,105,821 to S. W. Johnson, and U.S. Pat. No. 3,053,688 to H. G. Greig. Both of these early patents recognised the virtues of silicone fluids, but the understanding of the functioning of liquid toners at that time was relatively empirical. More recently silicone fluids have again been recognised as desirable carrier fluids for liquid toners, as in for example U.S. Pat. No. 5,612,162 and U.S. Pat. No. 5,591,557, both to Lawson et al.

More specifically, U.S. Pat. No. 5,612,162 to Lawson et al. discloses a composition and a method of forming a liquid developer or a constituent of a liquid developer for electrostatography comprising the steps of dispersing at least one monomer in silicone fluid and polymerizing the at least one monomer to form polymer particles in the silicone fluid. A homopolymer or a copolymer may be formed and a colorant, such as a pigment or dye, and a charge control agent may be added before or after the polymerisation. The disclosure further states that the liquid developer may further include a polymerisation stabiliser which is compatible with the silicone fluid. The stabiliser may be a silicone fluid such as dimethyl polysiloxane.

It has been found that the high molecular weight, that is the 30,000 cSt and 60,000 cSt, dimethyl polysiloxane polymerisation stabilisers described in U.S. Pat. No. 5,612,162 that are compatible with silicone fluids, result in polymer dispersions that possess good suspension stability but poor fix strength, melt cohesion and adhesion properties.

If the liquid carrier component of the polymer dispersions discussed in U.S. Pat. No. 5,612,162, which is removed by oven drying or centrifugation/filtration, the polymer spheres remaining can be analysed for fix performance. In this case, the non-volatile content of this formulation will upon heating/melting followed by cooling, produce a solid that possesses minimal adhesive and cohesive properties. The solidified polymer forms a "chalky like" resin that can be easily abraded or broken with minimal force.

This property is obviously undesirable and when the polymer dispersion is formulated/incorporated into an ink jet ink for printing or liquid developer for electrostatography, the result is poor ink or liquid developer to substrate fix.

It is the object of this invention to provide improved polymerisation stabilisers.

It is a further objective of this invention to provide improved polymerisation stabilisers which result in the liquid ink or toner compositions exhibiting improved fix to a substrate.

BRIEF DESCRIPTION OF THE INVENTION

In one form therefore the invention is said to reside in a method of preparing a liquid ink or toner for printing comprising the steps of:

dispersing at least one monomer in a carrier fluid and a polymerisation stabiliser comprising a multi or single functional group containing polysiloxane, and in situ polymerising the at least one monomer to form uniform polymer particles dispersed in the carrier fluid.

In addition, the invention is said to reside in the above method; in which the multi or single functional group on the polysiloxane is selected from the group comprising amino, carboxylic acid, vinyl and hydroxyl.

Further, the invention is said to reside in the above method; wherein the polymerisation is by means of an addition reaction via a double bond, initiated by a polymerisation initiator.

The polymerisation initiator may be 2,2-azo-bis-isobutyronitrile (ALBN) and may be present in an amount of from 0.1 to 10% by weight of the polymer.

It has been found that the addition of the multi or single functional group containing polysiloxane in an in situ polymerisation process produces polymer dispersions in a carrier fluid, preferably silicone fluids, that have more desirable fixing properties. The non-volatile content of these improved polymer dispersions can be separated from the liquid content and analysed for fix performance. In this instance the separated polymer, upon heating/melting followed by cooling produces a solid that possesses greatly improved adhesive and cohesive properties. The solidified polymer forms a harder, more ductile resin that has much greater resistance to abrasion and breakage than that of the prior art discussed above.

This property is much more desirable and results in greatly improved ink to substrate fix when the polymer dispersion is formulated/incorporated into a liquid developer for electrostatography or ink for ink jet printing.

Preferably the multi or single functional group on the polysiloxane is selected from the group comprising amino, carboxylic acid, vinyl and hydroxyl.

Preferably the monomer is selected from the group comprising vinyl acetate, styrene, n-vinyl-2-pyrrolidone, acrylic acid and alkyl esters of acrylic acid and methacrylic acid and alkyl esters of methacrylic acid.

Preferably the carrier liquid is selected from the group comprising silicone fluids such as DC344® fluid, DC200® 1.5 cSt fluid, DC200® 20 cSt fluid, DC200® 100 cSt fluid and higher viscosity silicone fluids. The invention is not restricted to silicone fluids however, and hydrocarbon liquids such as isoparaffin liquids such as isopar G® and Isopar L® may also be used.

In an alternative form the invention is said to reside in a liquid ink or toner for printing comprising uniform polymer particles dispersed in a carrier fluid in which at least one monomer is dispersed in the carrier fluid with a polymerisation stabiliser comprising a multi or single functional group containing polysiloxane and polymerised in situ.

In an alternative form the invention is said to reside in a polymer dispersion adapted for use in or as a liquid developer for electrostatography or ink jet printing in which at least one monomer is dispersed in the carrier fluid with a multi or single functional group containing polysiloxane and polymerised in situ.

In an alternative form the invention is said to reside in a method of preparing a polymer dispersion adapted for use in or as a liquid developer for electrostatography or ink jet printing including the steps of dispersing at least one monomer in a carrier fluid and a polymerisation stabiliser comprising a multi or single functional group containing polysiloxane, and in situ polymerising the at least one monomer to form uniform polymer particles dispersed in the carrier fluid.

In an alternative form the invention is said to reside in a polymer dispersion or a liquid ink or liquid toner produced by the method as discussed above.

DETAILED DESCRIPTION OF THE INVENTION

The polymerisation stabilisers described in this invention give improved adhesive and cohesive properties and therefore fix. These stabilisers are poly siloxane compounds of various molecular weights that contain at least one functional group that is either surface active or polymerisation reactive. The stabiliser can either take part in the polymerisation reaction and therefore co-polymerise with the base monomer, or surface active stabilise the produced polymer during and after polymerisation.

Examples of polymerisation stabilisers that demonstrate the improved performance characteristics are given below. These materials are liquid polysiloxane polymers that possess at least one functional group, such as, a vinyl group, a carboxylic acid group, hydroxyl group or an amino group.

Elastosil M 4640A

Elastosil LR 3003/10A

Elastosil M 4600A

Finish WR 1101

The polysiloxane polymers can be represented by the following general structure:

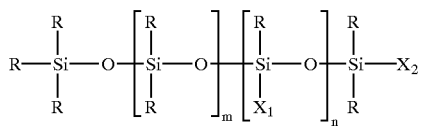

Where R represents an alkyl (ie: —$CH_3$) group or a hydroxyl group (—OH)

Where $X_1$ and $X_2$ represent functional groups with:
  (1) Amine functionality (ie: —$NH_2$)
  (2) Carboxylic acid functionality (ie: —COOH)
  (3) Vinyl functionality (ie: —CH=$CH_2$)
  (4) Hydroxyl functionality (ie: —OH)
  (5) Alkyl functionality (ie: —$CH_3$), but in this instance, either $X_1$ or $X_2$ must also contain some other functionality such as one of the groups from (1) to (4) above.
  (6) An alkyl group containing a different functional group such as one of the groups from (1) to (4) above, with appropriate stoichiometry, ie:
    —RX
    —RXR
    —RXRX
    —XR
    —XRX
    —XRXR where X is any one of (1) to (4) above and R is an alkyl group.

For example, if R is methyl functional and X is amine functional:
    —$CH_2NH_2$
    —$CH_2NHCH_3$
    —$CH_2NHCH_2NH_2$
    —$NHCH_2$
    —$NHCH_2NH_2$
    —$NHCH_2NHCH_3$ An example of a polymerisation reactive stabiliser is a vinyl functional polysiloxane stabiliser that both stabilises the polymerised monomer (ie. vinyl acetate) in the carrier fluid and also reacts (copolymerises or polymerises) through an addition reaction via the double bond, initiated by a polymerisation initiator such as 2,2-azo-bis-isobutyronitrile (ALBN), which is commonly employed as a polymerisation initiator or catalyst in polymerisation reactions. The polymerisation initiator provides a free radical which reacts with the monomer to produce a chain reaction that results in polymerisation of the said monomer to form the resulting polymer.

Alternatively, surface-active stabilisation can occur by means of the functional group (such as an amino group) of the chosen polysiloxane stabiliser.

In each case the result is a polymer dispersion of improved fixing characteristics, as previously described.

Although the applicant does not wish to be bound to this explanation it is believed that the improved fix performance achieved when using a polymerisation reactive stabiliser according to the present invention can be attributed to the production of a copolymer of the base monomer and the reactive stabiliser or the joint individual polymerisation of each species. This chemically changes the properties of the polymerised base monomer, consequently producing a polymer dispersion that consists of harder, tougher polymer particles resulting in improved fix performance.

In the case of improved fix performance by employing a surface active stabiliser (such as an amino functional stabiliser), it is believed that the fix improvement can be attributed to the strong adsorption of the functional portion (surface active site) of the stabiliser onto the polymerised monomer as it forms dispersed polymer spheres during polymerisation. This strong adsorption enables the polymer spheres to be well dispersed and during fixing procedures, prevents the formation of any polymer particle to polymer particle slippage occurring due to poor surface adsorption, where the stabiliser can act as a lubricant between particles and therefore inhibit fix.

In contrast it is believed that this slippage effect is the primary cause of the poor fix strength associated with the polymer dispersion examples in U.S. Pat. No. 5,612,162.

In U.S. Pat. No. 5,612,126, "example 1" employs a non-functional di-methyl polysiloxane polymerisation stabiliser, which when tested demonstrates poor fix strength, melt cohesion and adhesion properties. We believe the reason for poor fix can be attributed to the poor surface adsorption strength of the stabiliser to the polymer particle in this polymer dispersion, which results in a polymer particle to polymer particle "slip plane" being formed, due to the stabiliser acting as a lubricant.

This can be demonstrated by separating and then washing the non-volatile portion of the above "example 1" with a low viscosity, volatile silicone fluid. This procedure will remove the weakly adhered non-functional di-methyl polysiloxane stabiliser from the polymer surface into the volatile silicone fluid phase, leaving behind the pure polymer which then demonstrates improved fix. This does not occur with the functional group containing stabilisers described in this patent, as they either strongly adsorb to the polymer surface or take part in the polymerisation reaction.

The use of functional group containing polysiloxanes as stabilisers, is not only limited to in situ monomer polymerisation in silicone fluid carrier liquids. These stabilisers can also be successfully used as stabilisers with other carrier fluids, including hydrocarbon liquids such as Isopar G® and Isopar L®.

The resultant polymer dispersion can be used in or as a liquid developer for electrostatography or ink jet printing. Upon fusing, these polymers form harder, more ductile deposits than prior art polymer dispersions which employ silicone fluids as the base carrier fluid in the polymer dispersion and use high viscosity, non functional group containing polydimethyl siloxanes as the polymerisation stabiliser.

A particular advantage of the use of the polymerisation stabilisers of the present invention is that it enables more stable polymer dispersions with smaller particle sizes to be produced.

EXAMPLES

This then generally describes the present invention but to assist with understanding the instant invention, reference will now be made to examples which define the invention more fully without any intention of being limited thereby.

The method of polymerisation in the examples below is as follows. The carrier liquid (DC344 fluid) containing the miscible polymerisation stabiliser is heated in a vessel to a reaction temperature of approximately 120° C. The monomer (containing the soluble initiator, ALBN) is then slowly added to the heated carrier liquid/polymerisation stabiliser solution under reflux conditions whereby dispersion polymerisation of the monomer takes place. After the polymerisation reaction subsides, a stabilised polymer solution is produced.

EXAMPLE 1

In situ of polymerisation of vinyl acetate in low viscosity polydimethyl siloxane with amino function polysiloxane stabiliser.

| DC 344 ® Fluid | 76.1 g |
| Finish WR1101 | 0.9 g |
| Vinyl Acetate | 22.8 g |
| AIBN | 0.2 g |

DC 344® Fluid is a silicone fluid made by Dow Corning, U.S.A. Finish WR1101 is a polysiloxane having an amino functional group, made by Wacker Chemicals, Munich Germany.

Example 1 employs a surface active (amino functional) polymerisation stabiliser. The polymerisation stabiliser, Finish WR1101 can be used in quantities from 0.1–10 g, preferably 0.6–1.0 g. results in a polymer that provides The above example yielded a polymer that provides improved and desirable mechanical properties and therefore exhibiting improved fixing properties to a substrate.

EXAMPLE 2

In situ polymerisation of vinyl acetate in low viscosity polydimethyl siloxane with hydroxyl functional polysiloxane stabiliser.

| DC 344 ® Fluid | 75.2 g |
| Elastosil LR 3003/10A | 1.8 g |
| Vinyl Acetate | 22.8 g |
| AIBN | 0.2 g |

Elastosil LR 3003/10A is a polysiloxane having a hydroxyl functional group made by Wacker Chemicals, Munich Germany.

Example 2 employs a surface active (hydroxy functional) polymerisation stabiliser. The polymerisation stabiliser, LR 3003/10A can be used in quantities from 0.5–10 g, preferably 1–2 g.

The above example yielded a polymer that provides improved and desirable mechanical properties and therefore exhibiting improved fixing properties to a substrate.

EXAMPLE 3

In situ polymerisation of vinyl acetate in low viscosity polydimethyl siloxane with vinyl functional polysiloxane stabiliser

| DC 344 ® Fluid | 76.1 g |
| Elastosil M4640A | 0.9 g |
| Vinyl Acetate | 22.8 g |
| AIBN | 0.2 g |

Elastosil M4640A is a polysiloxane having a vinyl functional group made by Wacker Chemicals, Munich Germany.

Example 3 employs a polymerisation reactive (vinyl functional) stabiliser. The polymerisation stabiliser, M4640A can be used in quantities from 0.5–10 g, preferably 0.5–1.5 g.

The above example yielded a polymer that provides improved and desirable mechanical properties and therefore exhibiting improved fixing properties to a substrate.

Throughout this specification unless the context requires otherwise, the words 'comprise' and 'include' and variations such as 'comprising' and 'including' will be understood to imply the inclusion of a stated integer or group of integers but not the exclusion of any other integer or group of integers.

Throughout this specification various indications have been given as to the scope of this invention but the invention is not limited to any one of these but may reside in two or more of these combined together. The examples are given for illustration only and not for limitation.

What is claimed is:

1. A method of preparing a liquid ink or liquid toner for printing including the steps of:
   dispersing at least one monomer in a silicone carrier fluid and a polymerisation stabiliser comprising a polysiloxane containing a functional group selected from the group comprising amino, carboxylic acid, vinyl and hydroxyl groups, and
   in situ polymerising the at least one monomer to form uniform polymer particles dispersed in the carrier fluid.

2. A method as in claim 1 wherein the polymerisation is by means of an addition reaction via a double bond, initiated by a polymerisation initiator.

3. A method as in claim 1 wherein the polymerisation stabilisation is by means of a surface-active stabilisation by means of the functional group of the polysiloxane stabiliser.

4. A method as in claim 1 in which the monomer is selected from the group comprising vinyl acetate, styrene, n-vinyl-2-pyrrolidone, acrylic acid and alkyl esters of acrylic acid and methacrylic acid and alkyl esters of methacrylic acid.

5. A method as in claim 1 in which the carrier liquid is selected from the group comprising silicone fluids such as DC344® fluid, DC200® 1.5 cSt fluid, DC200® 20 cSt fluid, DC200® 100 cSt fluid and higher viscosity silicone fluids.

6. A method as in claim 2 in which the polymerisation initiator is 2,2-azo-bis-isobutyronitrile.

7. A method as in claim 1 wherein the polymerisation stabiliser is present in an amount of from 0.1 to 10% by weight of the polymer.

8. A method as in claim 1 wherein the polymerisation stabiliser is represented by the following general structure:

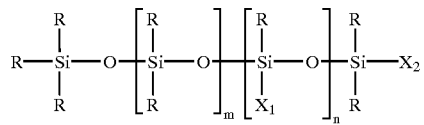

where R represents an alkyl group or a hydroxyl group and $X_1$ and $X_2$ represent functional groups with:
   (1) Amine functionality:
   (2) Carboxylic acid functionality;
   (3) Vinyl functionality:
   (4) Hydroxyl functionality;
   (5) Alkyl functionality when $X_1$ or $X_2$ contains a different functionality; or
   (6) An alkyl group different from R and containing as a different functional group with appropriate stoichiometry —$R_1X_3$, —$R_1X_3R_2$, —$R_1X_3R_2X_4$, —$X_3R_1$, —$X_3R_1X_4$, or —$X_3R_1X_4R_2$, where $X_3$ and $X_4$ are any of the functionalities of (1) to (4) above and $R_1$ and $R_2$ are both alkyl groups.

9. A polymer dispersion adapted for use in or as a liquid developer for electrostatography or ink jet printing formed by dispersion of at least one monomer in a silicone carrier fluid with a polymerisation stabiliser comprising a polysiloxane containing a functional group selected from the group comprising amino, carboxylic acid, vinyl and hydroxyl groups and subsequent polymerisation in situ of the at least one monomer.

10. A method of preparing a polymer dispersion adapted for use in or as a liquid developer for electrostatography or ink jet printing including the steps of:
    dispersing at least one monomer in a silicone carrier fluid and a polymerisation stabiliser comprising a polysiloxane containing a functional group selected from the group comprising amino, carboxylic acid, vinyl and hydroxyl groups, and
    in situ polymerising the at least one monomer to form uniform polymer particles dispersed in the carrier fluid.

11. A method as in claim 10 in which the monomer is selected from the group comprising vinyl acetate, styrene, n-vinyl-2-pyrrolidone, acrylic acid and alkyl esters of acrylic acid and methacrylic acid and alkyl esters of methacrylic acid.

12. A method as in claim 10 in which the carrier liquid is selected from the group comprising silicone fluids such as D0344® fluid, DC200® 1.5 cSt fluid, DC200® 20 cSt fluid, DC200®100 cSt fluid and higher viscosity silicone fluids.

13. A method as in claim 10 wherein the polymerisation is by means of an addition reaction via a double bond, initiated by a polymerisation initiator.

14. A method as in claim 13 in which the polymerisation initiator is 2,2-azo-bis-isobutyronitrile.

15. A method as in claim 10 wherein the polymerisation stabilisation is by means of a surface-active stabilisation by means of the functional group of the polysiloxane stabiliser.

16. A method as in claim 10 wherein the polymerisation stabiliser is present in an amount of from 0.1 to 10% by weight of the polymer.

17. A liquid ink or toner for printing comprising uniform polymer particles dispersed in a silicone carrier fluid in which at least one monomer is dispersed in the carrier fluid with a polymerisation stabiliser comprising a polysiloxane containing a functional group selected from the group comprising amino, carboxylic acid, vinyl and hydroxyl groups and polymerised in situ.

18. A liquid ink or liquid toner produced by the method of claim 1.

19. A polymer dispersion for a liquid ink or liquid toner produced by the method of claim 10.

20. A method as in claim 8 wherein said when alkyl functionality (5) is present $X_1$ or $X_2$ contains a functionality selected from the groups (1) to (4).

21. A method as in claim 8 wherein said alkyl group (6) contains a functionality selected from the groups (1) to (4).

* * * * *